Aug. 21, 1956     L. GALINSKI     2,760,092

AUTOMATIC CLUTCHES FOR MOTOR-DRIVEN GEARS

Filed March 22, 1952

INVENTOR.
Leo Galinski
BY Clarence E. Threedy
HIS ATTORNEY.

United States Patent Office 2,760,092
Patented Aug. 21, 1956

2,760,092

AUTOMATIC CLUTCHES FOR MOTOR-DRIVEN GEARS

Leo Galinski, Chicago, Ill., assignor, by mesne assignments, to General Patent Corporation, Chicago, Ill., a corporation of Illinois Application March 22, 1952, Serial No. 278,079

1 Claim. (Cl. 310—83)

This invention relates to automatic clutches for motor-driven gears and has for an object the provision of an improved construction of this character which will be highly efficient in use and economical in manufacture.

Among the salient objects of the invention is the provision of a driving gear and a driven gear of a construction such that the driving gear, when the motor is energized, will move rapidly transversely of the driven gear into driving engagement therewith without clashing or rupturing the teeth of either gear, and, when the motor is deenergized, the driving gear will instantly, freely, and smoothly move from such driving engagement with the driven gear.

A further object of the invention is the provision of a driving gear and a driven gear each of a construction such as will assure driving engagement between the gears irrespective of whether the teeth of one of the gears are out of alignment with respect to the teeth of the other of the gears.

Yet another object of the invention is the provision of a motor having a rotor which, when the motor is de-energized, is projected from its normal operative position with respect to the stator and having on the shaft of the rotor a driving gear which, when the rotor is caused to assume its operative position with respect to the stator of the motor, will move the driving gear into meshing engagement with the driven gear in a manner such that instant driving connection results between the driving gear and the driven gear, and when the motor is deenergized the rotor and driving gear mounted on its shaft will be projected from its proper operative position with respect to the stator, whereby to disengage the driving connection between the driving gear and the driven gear.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
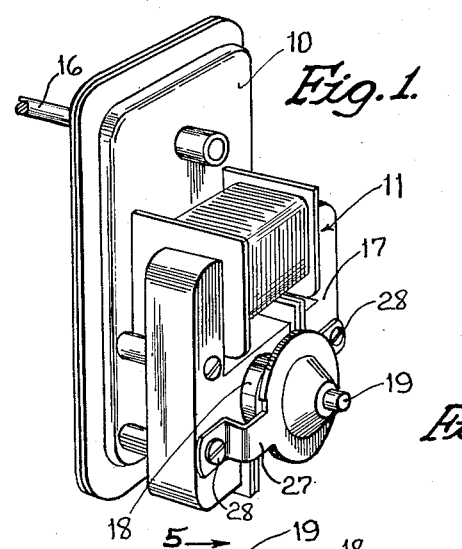
Fig. 1 is a perspective view of a motor embodying my invention.
Figure 2:
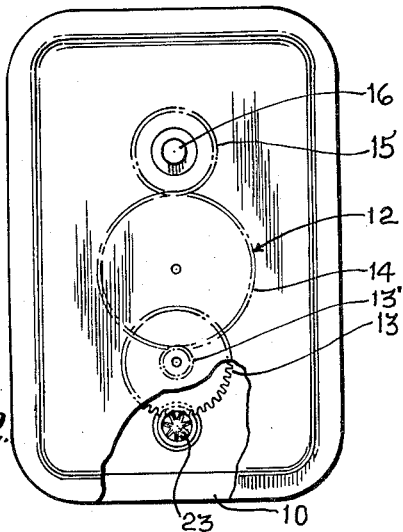
Fig. 2 is an elevational view of one side of the motor.
Figure 3:
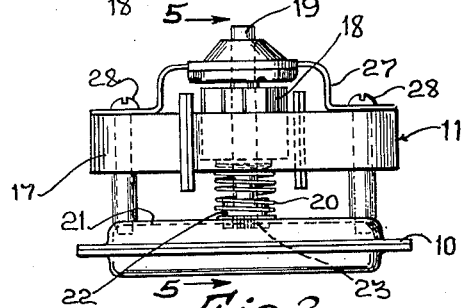
Fig. 3 is a bottom plan view of the same showing the rotor offset with respect to the stator.
Figure 4:
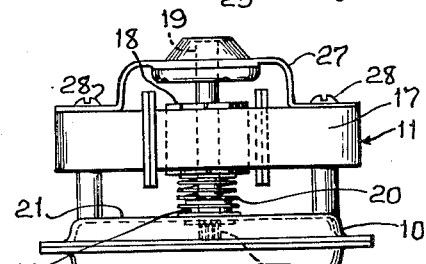
Fig. 4 is a bottom view similar to Fig. 3, but showing the rotor attracted to its normal operative position with respect to the stator.
Figure 5:
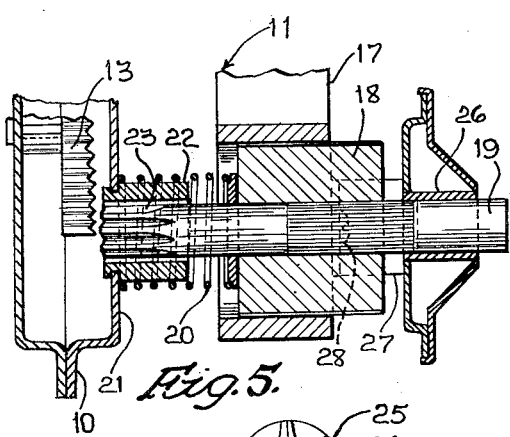
Fig. 5 is an enlarged sectional detail view taken substantially on line 5—5 of Fig. 3.
Figure 6:
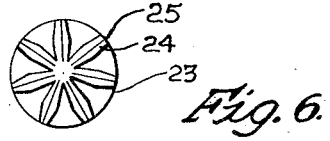
Fig. 6 is an end view of the driving gear embodied in the invention.
Figure 7:
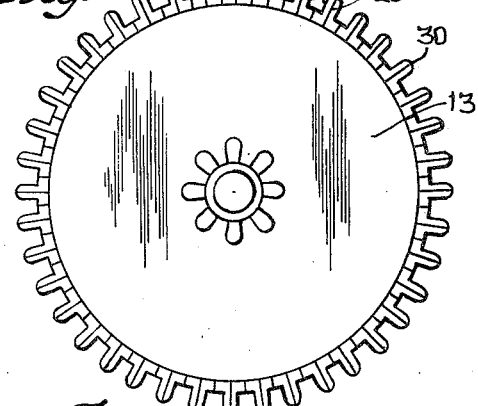
Fig. 7 is an enlarged elevational view of a driven gear embodied in the invention.

In the drawings I have shown a preferred form of construction by which the several objects of my invention are accomplished. In this connection, a mounting plate is indicated at 10 and it is by means of this mounting plate that the motor 11 is mounted to a fixed support. This mounting plate 10 is hollow in construction to provide an enclosure for a train of gears 12 including a driven gear 13, an intermediate gear 14, and a pinion 15, the latter mounted on a work shaft 16, the intermediate gear being operatively connected to the driven gear by a pinion 13'. The motor 11 comprises a stator 17 and a rotor 18. The rotor 18 is mounted on a shaft 19, and this shaft 19 together with its rotor is normally projected laterally with respect to the stator 17 by means of a spring 20 arranged between the rotor 18 and the adjacent wall 21 of the mounting plate 10 and mounted to embrace a sleeve 22 fixed to the wall 21. One end of this rotor shaft 19 is formed to provide a driving gear 23. The corresponding sides 24 of each tooth of this gear 23 are formed substantially triangular in cross section, and the top edges of the gear are preferably flat as at 25. The opposite end portion of the rotor shaft 19 is journalled through a bearing 26 provided by a bracket 27 fixed to the stator 17 as at 28.

The teeth of the driven gear 13 at corresponding sides 29 are likewise triangular in cross section, with the apexes extending radially from the long axis of the gear 13. The tops 30 of the teeth of the gear 13 are semicircular in cross section and merge into parallel adjacent walls 29'. By forming the abutting faces or sides of the teeth of the driving gear 23 and those of the driven gear 13 triangular in cross section, with the apexes extending radially with respect to the long axis of the gears, whenever the gears are moved into meshing relation with respect to each other such gears will be self-aligning so that a proper driving engagement will result, irrespective of whether the teeth of the one gear are out of alignment with respect to the teeth of the other of the gears.

In operation, when the stator 17 is energized the magnetic field thus created will attract the rotor 18 and shift the latter into proper operative position with respect to the stator, against the action of the spring 20. The rotor 18 will maintain this position with respect to the stator 17 as long as the stator remains energized. When the stator is deenergized, the spring 20 then acts upon the rotor and shifts the rotor and its shaft laterally with respect to the stator. When the rotor is moved by magnetic attraction created by the energized stator, the gear 23 will move into meshing relation with respect to the gear 13 and will remain in such relationship until the stator is deenergized and the rotor 17 and its shaft 19 move laterally with respect to the stator 17 by the action of the spring 20. By disengaging the driving gear from the driven gear when the stator of the motor is deenergized, which results in the rotor being moved from the magnetic field of the stator by the spring 20, the work shaft 16 can be freely and manually rotated when occasion requires.

By this arrangement an automatic clutch is provided whereby to accomplish the object of moving a motor-driven gear rapidly into driving engagement with the driving gear without clashing or rupturing either of the gears and, when the motor is deenergized, the driving gear will instantly and freely move from such driving engagement with the driven gear.

The simplicity of construction of my invention will be obvious from the description herein.

My improved motor is capable of many uses and may be manufactured at an economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An automatic clutch mechanism for driven gears of an electric motor comprising a housing for said motor driven gears, a stator having a rotor and movable in one direction with respect thereto when said motor is energized, a lateral extending bearing carried by said housing in spaced relation between said stator and said housing, a shaft projecting laterally of said bearing and fixedly supporting said rotor intermediate its ends, said shaft being provided at one end within said bearing and about its circumference with gear teeth, said shaft together with said teeth movable longitudinally through said bearing into said housing for engagement with one gear of said driven gears when said stator is energized, and spring means embracing said bearing and having one end engaging said housing and the other end engaging said rotor for projecting said rotor and said shaft laterally out of said housing when said stator is deenergized.

References Cited in the file of this patent

UNITED STATES PATENTS

| | | |
|---|---|---|
| 1,274,575 | Midgley | Aug. 6, 1918 |
| 1,581,292 | Ross | Apr. 20, 1926 |
| 1,934,665 | Goldsborough | Nov. 7, 1933 |
| 1,935,005 | Ash | Nov. 14, 1933 |
| 2,003,795 | Wilsing | June 4, 1935 |
| 2,270,156 | Andrew | Jan. 13, 1942 |
| 2,334,040 | Schellens | Nov. 9, 1943 |